US010489495B2

(12) United States Patent
Lee et al.

(10) Patent No.: US 10,489,495 B2
(45) Date of Patent: Nov. 26, 2019

(54) DOCUMENT COLLABORATION APPARATUS FOR SUPPORTING SIMULTANEOUS EDITING OF STYLES FOR OBJECTS AND OPERATING METHOD THEREOF

(71) Applicant: HANCOM INC., Seongnam-si, Gyeonggi-do (KR)

(72) Inventors: Taeju Lee, Yongin-si (KR); Yongkyung Oh, Yongin-si (KR); Kyury Kim, Seoul (KR)

(73) Assignee: HANCOM INC., Seongnam-si, Gyeonggi-do (KR)

( * ) Notice: Subject to any disclaimer, the term of this patent is extended or adjusted under 35 U.S.C. 154(b) by 238 days.

(21) Appl. No.: 15/516,679

(22) PCT Filed: Jun. 28, 2016

(86) PCT No.: PCT/KR2016/006886
§ 371 (c)(1),
(2) Date: Apr. 4, 2017

(87) PCT Pub. No.: WO2018/004025
PCT Pub. Date: Jan. 4, 2018

(65) Prior Publication Data
US 2018/0267940 A1    Sep. 20, 2018

(51) Int. Cl.
*G06F 17/22* (2006.01)
*G06F 17/24* (2006.01)
*G06F 3/14* (2006.01)

(52) U.S. Cl.
CPC ........ *G06F 17/2247* (2013.01); *G06F 3/1454* (2013.01); *G06F 17/24* (2013.01)

(58) Field of Classification Search
CPC .................................................. G06F 17/2247
See application file for complete search history.

(56) References Cited

U.S. PATENT DOCUMENTS 8,453,052 B1 *  5/2013  Newman ............. G06F 17/2211
                                                                 715/255
8,909,596 B1   12/2014  Zhang et al.
(Continued)

FOREIGN PATENT DOCUMENTS

KR    10-2009-0002252 A    1/2009
KR    10-2014-0147093 A   12/2014
(Continued)

OTHER PUBLICATIONS

Sun, David, Steven Xia, Chengzheng Sun, and David Chen. "Operational transformation for collaborative word processing." In Proceedings of the 2004 ACM conference on Computer supported cooperative work, pp. 437-446. ACM, 2004. (Year: 2004).*
(Continued)

*Primary Examiner* — Frank D Mills
(74) *Attorney, Agent, or Firm* — Park, Kim & Suh, LLC (57) ABSTRACT

Disclosed are a document collaboration apparatus for supporting simultaneous editing of styles of objects and an operating method thereof in which when an access request for simultaneous editing of one electronic document is received from a plurality of users, the electronic document is converted into a markup language based document and provided to the respective users and thereafter, the markup language based document to which the same style editing is reflected is supported to be continuously maintained among the plurality of users to enable the plurality of users to commonly edit the document.

13 Claims, 3 Drawing Sheets

(56) References Cited

U.S. PATENT DOCUMENTS

| | | | |
|---|---|---|---|
| 9,292,482 B1* | 3/2016 | Thiesen | G06F 16/93 |
| 2006/0200755 A1 | 9/2006 | Melmon et al. | |
| 2011/0078246 A1* | 3/2011 | Dittmer-Roche | G06F 17/2288 709/205 |
| 2013/0138733 A1 | 5/2013 | Heinrich | |
| 2013/0246901 A1 | 9/2013 | Massand | |
| 2013/0283147 A1* | 10/2013 | Wong | G06F 17/21 715/234 |
| 2015/0199319 A1 | 7/2015 | Newman et al. | |

FOREIGN PATENT DOCUMENTS

| | | |
|---|---|---|
| WO | 2009/061638 A1 | 5/2009 |
| WO | 2013/109552 A1 | 7/2013 |
| WO | 2013/148382 A1 | 10/2013 |

OTHER PUBLICATIONS

International Search Report in International Application No. PCT/KR2016/006886 dated Mar. 27, 2017 with English translation, 5pages.

Korean Office Action in Appln. No. 10-2017-7000809 dated Feb. 19, 2017 with English Translation.

* cited by examiner

DOCUMENT COLLABORATION APPARATUS FOR SUPPORTING SIMULTANEOUS EDITING OF STYLES FOR OBJECTS AND OPERATING METHOD THEREOF

CROSS-REFERENCE TO RELATED APPLICATIONS

This application is the National Stage filing under 35 U.S.C. 371 of International Application No. PCT/KR2016/006886, filed on Jun. 28, 2016, the contents of which are all hereby incorporated by reference herein in their entirety.

TECHNICAL FIELD

The present invention relates to a technology for a document collaboration apparatus for supporting simultaneous editing of an electronic document by multiple users and a method thereof.

BACKGROUND ART

In recent years, as electronic terminal devices such as a computer, a smart phone, a tablet PC, or the like have widely propagated, various types of electronic document related programs have been released, which enable reading, preparing, and editing the electronic document by using the electronic terminal devices.

The electronic document related programs include a word processor that supports preparation, editing, etc., of basic documents, a spreadsheet that assists input of data, an arithmetic operation, and data management, and presentation programs for assisting presentation by presenters.

In the related art, a user should read or prepare and edit the electronic documents by directly installing the electronic document related programs in the electronic terminal devices and thereafter, driving the electronic document related programs in order to read, prepare, and edit the electronic documents by using the electronic terminal devices.

However, in recent years, as an ultrahigh-speed Internet environment has been constructed and a wireless Internet environment has been constructed, which enables accessing the Internet anytime and anywhere, an electronic document related service is provided to the electronic terminal device as a client terminal through a server at a remote place, and as a result, a web based electronic document service has appeared, which enables reading, preparing, and editing the electronic document anytime and anywhere even though the user does not install a predetermined electronic document related program in the electronic terminal device.

The web based electronic document service is primarily used in enterprises or groups in that the web based electronic document service supports various client terminals to read, prepare, and edit the electronic documents through a browser installed in the client terminals after accessing an electronic document service providing server and supports various client terminals to perform simultaneous collaboration in real time with respect to electronic documents.

If the web based electronic document service may access the Internet without the need of installing the predetermined electronic document preparation program in the client terminal, since the web based electronic document service supports the electronic documents to be read, prepared, and edited through the browser mounted on the client terminal, mobility of the user may be guaranteed, and as a result, there is a tendency that personal users have gradually increased.

In general, when the web based electronic document service converts an original electronic document into a markup language based document and provides the markup language based document to the client terminal in order to support the client terminals connected through a network to edit the electronic documents through the browser, the web based electronic document service is operated in such a manner that the client terminal edits the markup language based document through the browser.

In this regard, in the web based electronic document service, a technology is required for supporting a plurality of users to perform simultaneous editing by simultaneously accessing one electronic document and in particular, a research into a technology is required for enabling a style changing operation to be appropriately performed when the plurality of users applies an editing command to change styles of corresponding objects to different styles with respect to the same objects among a plurality of objects including an image, a table, a text, and the like included in the electronic document.

SUMMARY OF THE INVENTION

Technical Problem

In a document collaboration apparatus for supporting simultaneous editing of styles of objects and an operating method thereof according to the present invention, when an access request for simultaneously editing one electronic document is received from a plurality of users, the electronic document is converted into a markup language based document and provided to respective users and thereafter, when an editing command associated with setting styles for objects included in the markup language based document is received from the respective users, the editing command received from another user is shared by the respective users to reflect all style editing matters of other users to the markup language based document edited by each user and commonly apply the style according to a reference editing command to duplicated objects on the markup language based document edited by each user according to the reference editing command which should be preferentially applied to the duplicated objects, thereby enabling common document editing among the plurality of users by supporting the markup language based document to which the same style editing is reflected to be continuously maintained among the plurality of users.

Technical Solution

An exemplary embodiment of the present invention provides a document collaboration apparatus for supporting simultaneous editing of styles for objects, including: a document transmitting unit converting, when an access request for editing an original electronic document is received from a client terminal of a first user and the client terminal of a second user, the original electronic document into a markup language based document and transmitting the markup language based document to the client terminal of the first user and the client terminal of the second user; a duplicated object verifying unit verifying, when a first editing command configured to set a first style with respect to at least one first object among a plurality of objects included in the markup language based document is received from the client terminal of the first user and a second editing command configured to set a second style with respect to at least one second object among the plurality of objects included in the markup language based document is received from the client terminal of the second user, whether one or more duplicated objects exist among the at least one first object and the at least one second object; a reference editing command selecting unit selecting, when it is verified that at least one duplicated object exists, any one editing command of the first editing command and the second editing command as a reference editing command; an editing command bundle generating unit generating a third editing command configured to set the first style with respect to the at least one duplicated object and thereafter, generating an editing command bundle configured to sequentially execute the second editing command and the third editing command when the first editing command between the first editing command and the second editing command is selected as the reference editing command; and an editing command transmitting unit transmitting the first editing command to the client terminal of the second user and transmitting the editing command bundle to the client terminal of the first user.

Another exemplary embodiment of the present invention provides an operating method of a document collaboration apparatus for supporting simultaneous editing of styles for objects, including: converting, when an access request for editing an original electronic document is received from a client terminal of a first user and the client terminal of a second user, the original electronic document into a markup language based document and transmitting the markup language based document to the client terminal of the first user and the client terminal of the second user; verifying, when a first editing command configured to set a first style with respect to at least one first object among a plurality of objects included in the markup language based document is received from the client terminal of the first user and a second editing command configured to set a second style with respect to at least one second object among the plurality of objects included in the markup language based document is received from the client terminal of the second user, whether one or more duplicated objects exist among the at least one first object and the at least one second object; selecting, when it is verified that at least one duplicated object exists, any one editing command of the first editing command and the second editing command as a reference editing command; generating a third editing command configured to set the first style with respect to the at least one duplicated object and thereafter, generating an editing command bundle configured to sequentially execute the second editing command and the third editing command when the first editing command between the first editing command and the second editing command is selected as the reference editing command; and transmitting the first editing command to the client terminal of the second user and transmitting the editing command bundle to the client terminal of the first user.

Advantageous Effects

In a document collaboration apparatus for supporting simultaneous editing of styles of objects and an operating method thereof according to the present invention, when an access request for simultaneously editing one electronic document is received from a plurality of users, the electronic document is converted into a markup language based document and provided to respective users and thereafter, when an editing command associated with setting styles for objects included in the markup language based document is received from the respective users, the editing command received from another user is shared by the respective users to reflect all style editing matters of other users to the markup language based document edited by each user and when the editing commands received from the respective users are generated from the duplicated objects, the style is commonly applied according to a reference editing command to duplicated objects on the markup language based document edited by each user according to the reference editing command which should be preferentially applied to the duplicated objects, thereby enabling common document editing among the plurality of users by supporting the markup language based document to which the same style editing is reflected to be continuously maintained among the plurality of users.

DETAILED DESCRIPTION

The present invention may have various modifications and various embodiments and specific exemplary embodiments will be illustrated in the drawings and described in detail in the detailed description. However, this does not limit the present invention to specific embodiments, and it should be understood that the present invention covers all the modifications, equivalents and replacements included within the idea and technical scope of the present invention. In describing each drawing, reference numerals refer to like elements.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, exemplary embodiments of the present invention will be described in detail with reference to the accompanying drawings.

Figure 1:
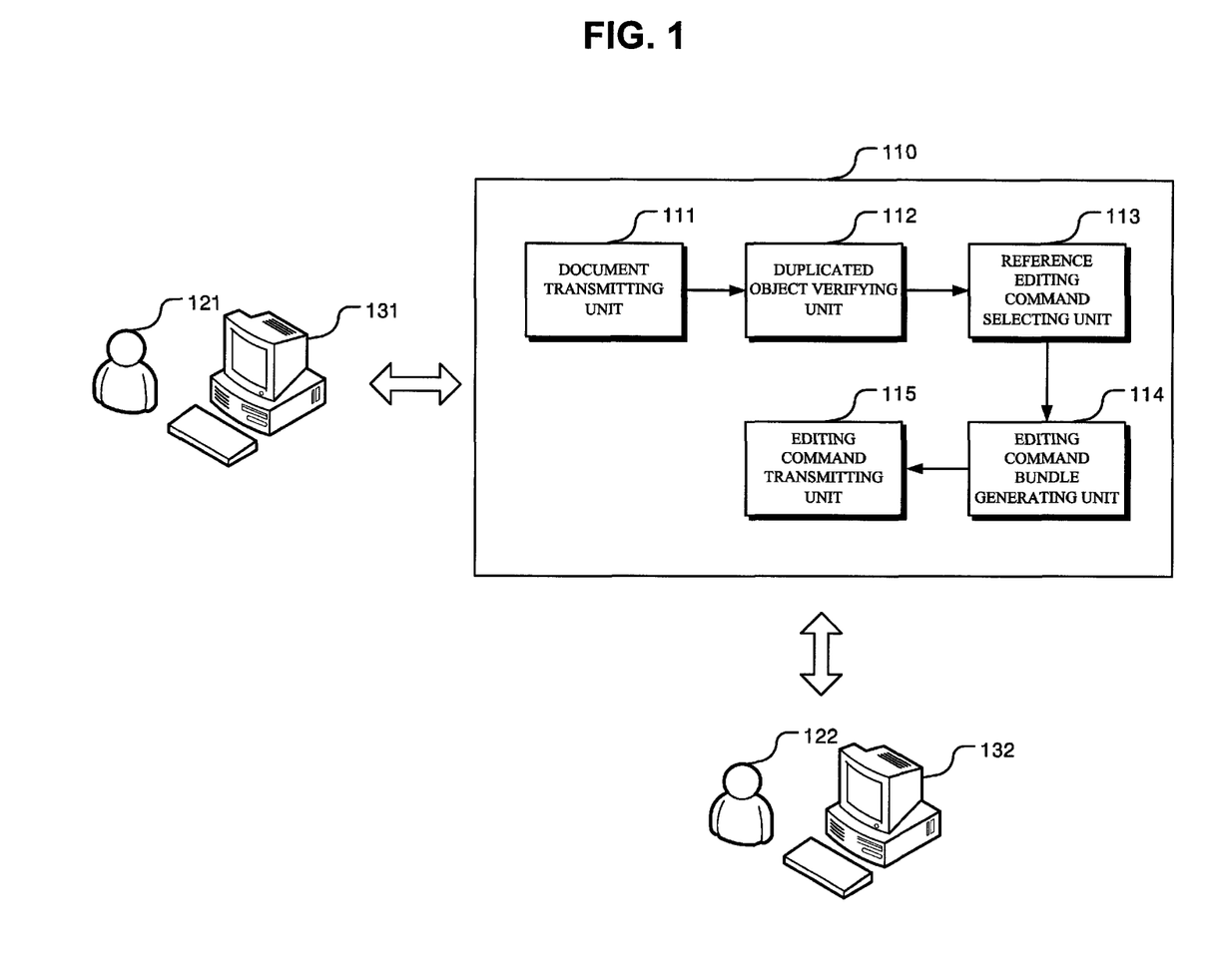
FIG. 1 is a diagram illustrating the structure of a document collaboration apparatus for supporting simultaneous editing of styles for objects according to an exemplary embodiment of the present invention.

FIG. 1 is a diagram illustrating the structure of a document collaboration apparatus for supporting simultaneous editing of styles for objects according to an exemplary embodiment of the present invention.

Referring to FIG. 1, the document collaboration apparatus 110 for supporting simultaneous editing of styles for objects according to the exemplary embodiment of the present invention includes a document transmitting unit 111, a duplicated object verifying unit 112, a reference editing command selecting unit 113, an editing command bundle generating unit 114, and an editing command transmitting unit 115.

Hereinafter, the structure of the document collaboration apparatus 110 for supporting simultaneous editing of styles for objects according to the exemplary embodiment of the present invention will be described in detail as an example with reference to a drawing illustrated in FIG. 2.

First, when the document collaboration apparatus 110 for supporting simultaneous editing of styles for objects receives an access request for editing an original electronic document 200 to be collaborated, which is stored in a predetermined document storage from a client terminal 131 of a first user 121 and a client terminal 132 of a second user 122, the document collaboration apparatus 110 may convert the original electronic document 200 into a markup language based document and transmit the markup language based document to the client terminal 131 of the first user 121 and the client terminal 132 of the second user 122.

Herein, the objects mean various contents including figures, images, tables, texts, and the like which may be inserted into the electronic document and in the exemplary embodiment, it is assumed that a text object "1234567890" is inserted into the original electronic document 200 as shown in reference numeral 200.

The markup language based document means a document configured by a markup language which may be read through the browser installed in the client terminal, such as a hypertext markup language (HTML) or an extensible markup language (XML).

For example, when the access request for the original electronic document 200 is received from the client terminal 131 of the first user 121 and the client terminal 132 of the second user 122 in the state where the original electronic document 200 having an extension such as "hwp" or "docx" is stored in the predetermined document storage, the document collaboration apparatus 110 for supporting simultaneous editing of styles for objects may extract the original electronic document 200 from the document storage and convert the original electronic document 200 into the markup language based document such as the HTML and thereafter, transmit the converted markup language based document to the client terminal 131 of the first user 121 and the client terminal 132 of the second user 122.

In this case, according to the exemplary embodiment of the present invention, the document storage storing the original electronic document 200 may be mounted in the document collaboration apparatus 110 for supporting simultaneous editing of styles for objects or configured by a standalone based device separately separated from the document collaboration apparatus 110 for supporting simultaneous editing of styles for objects.

In this case, when the client terminal 131 of the first user 121 receives the markup language based document from the document collaboration apparatus 110 for supporting simultaneous editing of styles for objects, the client terminal 131 of the first user 121 may display the markup language based document through a first browser as shown in reference numeral 211.

Similarly thereto, when the client terminal 132 of the second user 122 receives the markup language based document from the document collaboration apparatus 110 for supporting simultaneous editing of styles for objects, the client terminal 132 of the second user 122 may display the markup language based document through a second browser as shown in reference numeral 221.

In this case, when a first editing command to set a first style with respect to at least one first object among the plurality of objects included in the markup language based document displayed through the first browser is input by the first user 121 in the client terminal 131 of the first user 121, the client terminal 131 of the first user 121 may set the first style with respect to the at least one first object included in the markup language based document displayed through the first browser based on the first editing command and thereafter, transmit the first editing command to the document collaboration apparatus 110 for supporting simultaneous editing of styles for objects.

Herein, the style means a color, a shape, and the like of the object and when the object is the text, a font, the color, the size, and the like of the text may be the style for the text object and when the text is the table, the color of a cells included in the table, and the like may be the style for the table object.

In this regard, when the first editing command to set the font of the corresponding object as the first style "font 1" with respect to the at least one first object "12345678" among the plurality of objects "1234567890" included in the markup language based document displayed through the first browser is input by the first user 121 in the client terminal 131 of the first user 121, the client terminal 131 of the first user 121 may set as the first style "font 1" with respect to the at least one first object "12345678" included in the markup language based document displayed through the first browser based on the first editing command as shown in reference numeral 212 and thereafter, transmit the first editing command to the document collaboration apparatus 110 for supporting simultaneous editing of styles for objects.

In this case, according to the exemplary embodiment of the present invention, the first editing command may be constituted by an editing execution command for reflecting editing to the markup language based document, positional information of the at least one first object to which the editing execution command will be applied on the markup language based document, and first editing target information to define an attribute value for the first style.

In this regard, the first editing command may be configured as shown in Table 1 given below.

TABLE 1

| update font: font 1 [0,7] |
| --- |

In the first editing command shown in Table 1 given above, "update" means the editing execution command for reflecting the editing to the markup language based document, "font:font 1" means the attribute value for the first style to set "font 1" as the font of the object to, and "[0,7]" means the positional information of the at least one first object "12345678" on the markup language based document.

Therefore, according to Table 1, the first editing command may be constituted by the editing execution command "update" and the first editing target information "font:font 1 [0,7]" which is a target to which the editing execution command will be applied.

Herein, the positional information "[0,7]" represents a start point and an end point regarding at which point section the at least one first object is positioned on the markup language based document and when respective coordinates of "1234567890" which are the plurality of objects included in the markup language based document on the markup language based document are represented by "0" to "9" from the left side to the right side, one or more first objects "12345678" are objects which exist from the "0"-th coordinate up to the "7"-th coordinate on the markup language based document, and as a result, the positional information of the at least one first object on the markup language based document may be expressed as "[0,7]" as shown in Table 1.

As such, when the first editing command is generated by the client terminal 131 of the first user 121 and a second editing command to set a second style with respect to at least one second object among the plurality of objects included in the markup language based document displayed through the second browser is input by the second user 122 in the client terminal 132 of the second user 122, the client terminal 132 of the second user 122 may set the second style with respect to the at least one second object included in the markup language based document displayed through the second browser based on the second editing command and thereafter, transmit the second editing command to the document collaboration apparatus 110 for supporting simultaneous editing of styles for objects.

In this regard, as shown in reference numeral 222, when the second editing command to set as the font of the corresponding object the second style "font 2" with respect to the at least one second object "4567890" among the plurality of objects "1234567890" included in the markup language based document displayed through the second browser is input by the second user 122 in the client terminal 132 of the second user 122, the client terminal 132 of the second user 122 may set as the second style "font 2" with respect to the at least one second object "4567890" included in the markup language based document displayed through the second browser based on the second editing command as shown in reference numeral 222 and thereafter, transmit the second editing command to the document collaboration apparatus 110 for supporting simultaneous editing of styles for objects.

In this case, according to the exemplary embodiment of the present invention, the second editing command may be constituted by the editing execution command for reflecting the editing to the markup language based document, positional information of the at least one second object to which the editing execution command will be applied on the markup language based document, and second editing target information to define the attribute value for the second style.

In this regard, the second editing command may be configured as shown in Table 2 given below.

TABLE 2 update font:font 2 [3,9]

In the second editing command shown in Table 2 given above, "update" means the editing execution command for reflecting the editing to the markup language based document, "font:font 2" means the attribute value for the second style to set the font of the object to "font 2", and "[3.9]" means the positional information of the at least one second object "4567890" on the markup language based document.

Therefore, according to Table 2 given above, the second editing command may be constituted by the editing execution command "update" and the second editing target information "font:font 2 [3.9]" which is the target to which the editing execution command will be applied.

Herein, the positional information "[3.9]" represents a start point and an end point regarding at which point section the at least one second object is positioned on the markup language based document and when respective coordinates of "1234567890" which are the plurality of objects included in the markup language based document on the markup language based document are represented by "0" to "9" from the left side to the right side, one or more second objects "4567890" are objects which exist from the "3"-th coordinate up to the "9"-th coordinate on the markup language based document, and as a result, the positional information of the at least one second object on the markup language based document may be expressed as "[3.9]" as shown in Table 2 given above.

As such, when the first editing command is received by the document collaboration apparatus 110 supporting simultaneous editing of styles for objects from the client terminal 131 of the first user 121 and the second editing command is received by the document collaboration apparatus 110 supporting simultaneous editing of styles for objects from the client terminal 132 of the second user 122, the duplicated object verifying unit 112 verifies whether one or more duplicated objects exist among the at least one first object and the at least one second object.

In this case, the duplicated object verifying unit 112 compares the positional information of the at least one first object included in the first editing command on the markup language based document and the positional information of the at least one second object included in the second editing command on the markup language based document with each other to verify the objects having the same positional information as at least one duplicated object.

In this regard, since the at least one first object is "12345678" and the at least one second object is "4567890", both objects are objects in which "45678" is duplicated. Therefore, the duplicated object verifying unit 112 may verify the at least one duplicated object as "45678".

In this case, the reference editing command selecting unit 113 selects any one editing command of the first editing command and the second editing command when it is verified that the at least one duplicated object exists as the reference editing command.

In this case, according to the exemplary embodiment of the present invention, the reference editing command selecting unit 113 may select the editing command first received by the document collaboration apparatus 110 for supporting simultaneous editing of styles for objects between the first editing command and the second editing command as the reference editing command.

For example, when the document collaboration apparatus 110 for supporting simultaneous editing of styles for objects receives the first editing command transmitted from the client terminal 131 of the first user 121 earlier than the second editing command transmitted from the client terminal 132 of the second user 122, the reference editing command selecting unit 113 may select the first editing command as the reference editing command.

In this regard, as a scheme in which the reference editing command selecting unit 113 selects the reference editing command, various schemes may be applied in addition to the scheme of the exemplary embodiment and the scheme is not limited to the scheme of the exemplary embodiment. For example, the reference editing command selecting unit 113 may be configured to unconditionally select not a reception order of the editing command but the editing command received from the client terminal 132 of the second user 122 as the reference editing command and in this case, the reference editing command selecting unit 113 may select the second editing command as the reference editing command even though the document collaboration apparatus 110 for supporting simultaneous editing of styles for objects receives the first editing command earlier than the second editing command.

The editing command bundle generating unit 114 generates a third editing command configured to set the first style with respect to the at least one duplicated object and thereafter, generates an editing command bundle configured to sequentially execute the second editing command and the third editing command when the first editing command between the first editing command and the second editing command is selected as the reference editing command.

Figure 2:
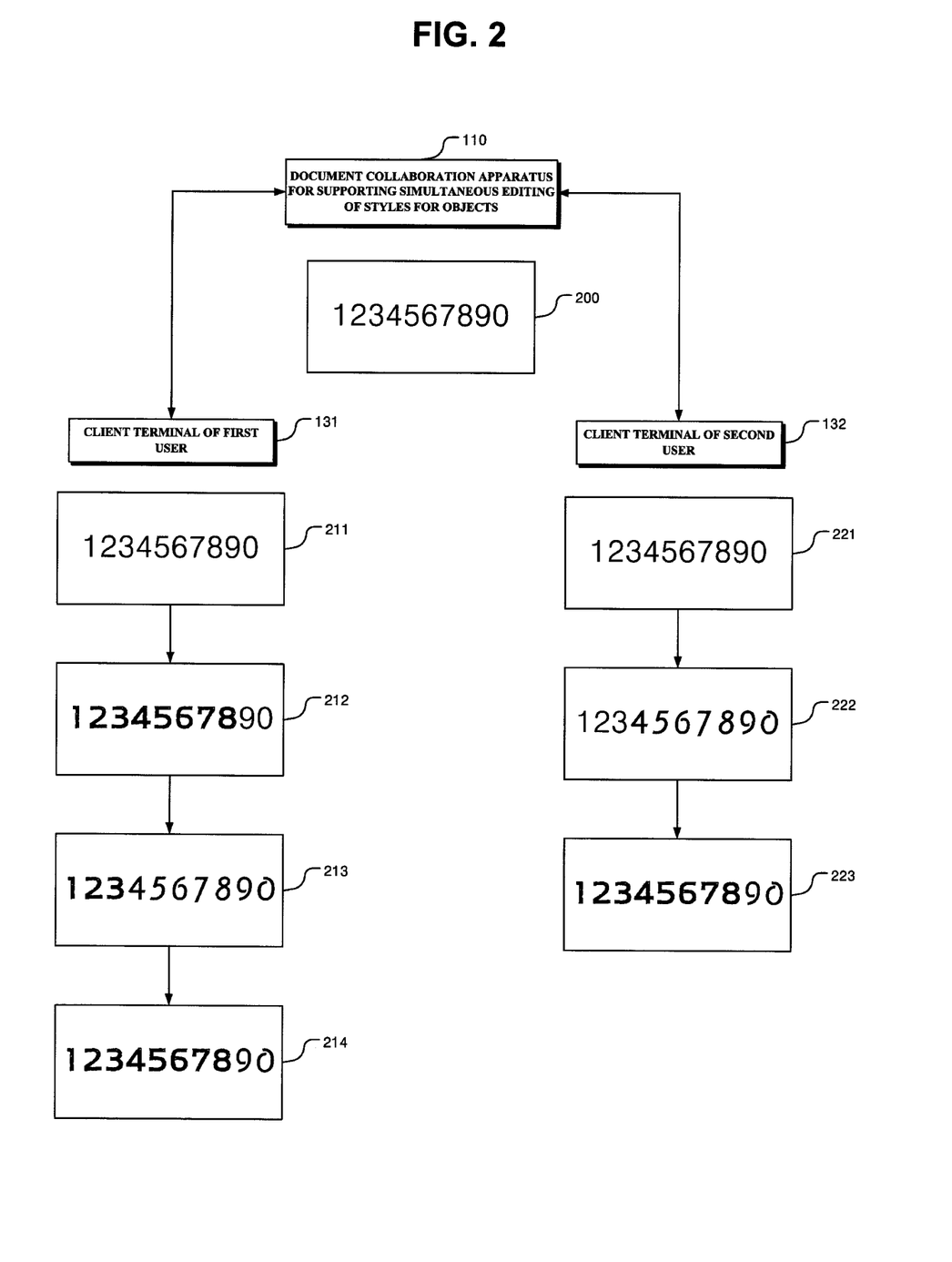
FIG. 2 is a diagram for describing an operation of a document collaboration apparatus for supporting simultaneous editing of styles for objects according to an exemplary embodiment of the present invention.

In this regard, in the exemplary embodiment of FIG. 2, since the at least one duplicated object is verified as "45678", the editing command bundle generating unit 114 may generate the third editing command to set the font of the corresponding object as the first style "font 1" with respect to the at least one duplicated object "45678" and thereafter, generate the editing command bundle configured to sequentially execute the second editing command and the third editing command.

In this case, according to the exemplary embodiment of the present invention, the third editing command may be constituted by an editing execution command for reflecting editing to the markup language based document, positional information of the at least one duplicated object to which the editing execution command will be applied on the markup language based document, and third editing target information to define the attribute value for the first style.

In this regard, the first editing command may be configured as shown in Table 3 given below.

TABLE 3 update font:font 1 [3,7]

In the third editing command shown in Table 3 given above, "update" means the editing execution command for reflecting the editing to the markup language based document, "font:font 1" means the attribute value for the first style to set the font of the object to "font 1", and "[3,7]" means the positional information of the at least one duplicated object "45678" on the markup language based document.

Therefore, according to Table 3, the third editing command may be constituted by the editing execution command "update" and the third editing target information "font:font 1 [3,7]" which is the target to which the editing execution command will be applied.

Herein, the positional information "[3.7]" represents a start point and an end point regarding at which point section the at least one duplicated object is positioned on the markup language based document and when respective coordinates of "1234567890" which are the plurality of objects included in the markup language based document on the markup language based document are represented by "0" to "9" from the left side to the right side, one or more duplicated objects "45678" are objects which exist from the "3"-th coordinate up to the "7"-th coordinate on the markup language based document, and as a result, the positional information of the at least one duplicated object on the markup language based document may be expressed as "[3.7]" as shown in Table 3 given above.

As such, when the editing command bundle generating unit 114 generates the editing command bundle, the editing command transmitting unit 115 transmits the first editing command to the client terminal 132 of the second user 122 and transmits the editing command bundle to the client terminal 131 of the first user 121.

In this case, when the client terminal 132 of the second user 122 receives the first editing command from the document collaboration apparatus 110 for supporting simultaneous editing of styles for objects, the client terminal 132 of the second user 122 may set the style of the at least one first object as the first style based on the first editing command with respect to the markup language based document in which the at least one second object is set as the second style according to the second editing command.

In this regard, when the client terminal 132 of the second user 122 receives the first editing command from the document collaboration apparatus 110 for supporting simultaneous editing of styles for objects, the client terminal 132 of the second user 122 may verify the at least one first object "12345678" based on the positional information of the at least one first object "12345678" included in the first editing command, verify "font:font 1" which is the attribute value of the first style included in the first editing command and thereafter, change the font of the at least one first object "12345678" to "font 1" according to the editing execution command "update" included in the first editing command, with respect to the markup language based document in which the at least one second object "4567890" is set as the second style "font 2" as shown in reference numeral 223.

Therefore, in the case of "1234567890" which are the plurality of objects included in the markup language based document displayed through the second browser of the client terminal 132 of the second user 122, the style may be applied in such a manner that the style of "12345678" is set as "font 1" in "12345678" and the style of "90" is set as "font 2".

Simultaneously thereto, when the client terminal 131 of the first user 121 receives the editing command bundle from the document collaboration apparatus 110 for supporting simultaneous editing of styles for objects, the client terminal 131 of the first user 121 may set the style of the at least one second object as the second style based on the second editing command included in the editing command bundle and reset the style of the at least one duplicated object as the first style based on the third editing command included in the editing command bundle, with respect to the markup language based document in which the at least one first object is set as the first style according to the first editing command.

In this regard, when the client terminal 131 of the first user 121 receives the editing command bundle to sequentially execute the second editing command and the third editing command from the document collaboration apparatus 110 for supporting simultaneous editing of styles for objects, the client terminal 131 of the first user 121 may first verify the at least one second object "4567890" based on the positional information of the at least one second object "4567890" included in the second editing command, verify "font:font 2" which is the attribute value of the second style included in the second editing command and thereafter, change the font of the at least one second object "4567890" to "font 2" according to the editing execution command "update" included in the second editing command, with respect to the markup language based document in which the at least one first object "12345678" is set as the first style "font 1" as shown in reference numeral 213.

Then, the client terminal 131 of the first user 121 may verify the at least one duplicated object "45678" based on the positional information of at last one duplicated object "45678" included in the third editing command as shown in reference numeral 214, verify "font:font 1" which is the attribute value of the first style included in the third editing command and thereafter, change the font of the at least one duplicated object "45678" to "font 1" according to the editing execution command "update" included in the third editing command.

Therefore, in the case of "1234567890" which are the plurality of objects included in the markup language based document displayed through the first browser of the client terminal 131 of the first user 121, the style may be finally applied in such a manner that the style of "12345678" is set as "font 1" and the style of "90" is set as "font 2" as shown in reference numeral 214.

As a result, the markup language based document displayed through the first browser of the client terminal 131 of the first user 121 and the markup language based document displayed through the second browser of the client terminal 132 of the second user 122 may maintain the same editing state as shown in reference numerals 214 and 223, and as a result, the first user 121 and the second user 122 may continuously perform simultaneous editing of the document.

Consequently, in the document collaboration apparatus 110 for supporting simultaneous editing of styles of objects according to the present invention, when an access request for simultaneously editing one electronic document is received from a plurality of users, the electronic document is converted into a markup language based document and provided to respective users and thereafter, when an editing command associated with setting styles for objects included in the markup language based document is received from the respective users, the editing command received from another user is shared by the respective users to reflect all style editing matters of other users to the markup language based document edited by each user and simultaneously, when the editing commands received from the respective users are generated from the duplicated objects, the style is commonly applied according to a reference editing command to duplicated objects on the markup language based document edited by each user according to the reference editing command which should be preferentially applied to the duplicated objects, thereby enabling common document editing among the plurality of users by supporting the markup language based document to which the same style editing is reflected to be continuously maintained among the plurality of users.

Up to now, the structure of the document collaboration apparatus 110 for supporting simultaneous editing of styles for objects, which is illustrated in FIG. 1 has been described in detail by using the example illustrated in FIG. 2. Herein, the example illustrated in FIG. 2 is just an exemplary embodiment used for more easily describing the present invention and the present invention is not limitedly applied to the example of FIG. 2.

For example, in the case where an original electronic document simultaneously accessed by the first user 121 and the second user 122 is a spreadsheet constituted by a plurality of cells, when the document collaboration apparatus 110 for supporting simultaneous editing of styles for objects according to the present invention converts the spreadsheet into the markup language based document and provides the converted markup language based document to the client terminal 131 of the first user 121 and the client terminal 132 of the second user 122 and thereafter, the first user 121 applies an editing command to set a color of at least one first cell among the plurality of cells to a first color and the second user 2 122 applies an editing command to set the color of at least one second cell among the plurality of cells to a second color, in the case where the duplicated cell exists among one or more first cells and one or more second cells, the document collaboration apparatus 110 for supporting simultaneous editing of styles for objects may be applied even to a process in which the color of the corresponding duplicated cell is reflected to the markup language based document edited by the first user 121 and the markup language based document edited by the second user 122 in the same manner according to the reference editing command.

In this case, the document collaboration apparatus 110 for supporting simultaneous editing of styles for objects according to the present invention may use not 1D coordinate information shown in Tables 1 to 3 but 2D coordinate information based on the positions of rows and columns of the respective cells as positional information for designing at positions where the editing command is applied to the plurality of cells.

Figure 3:
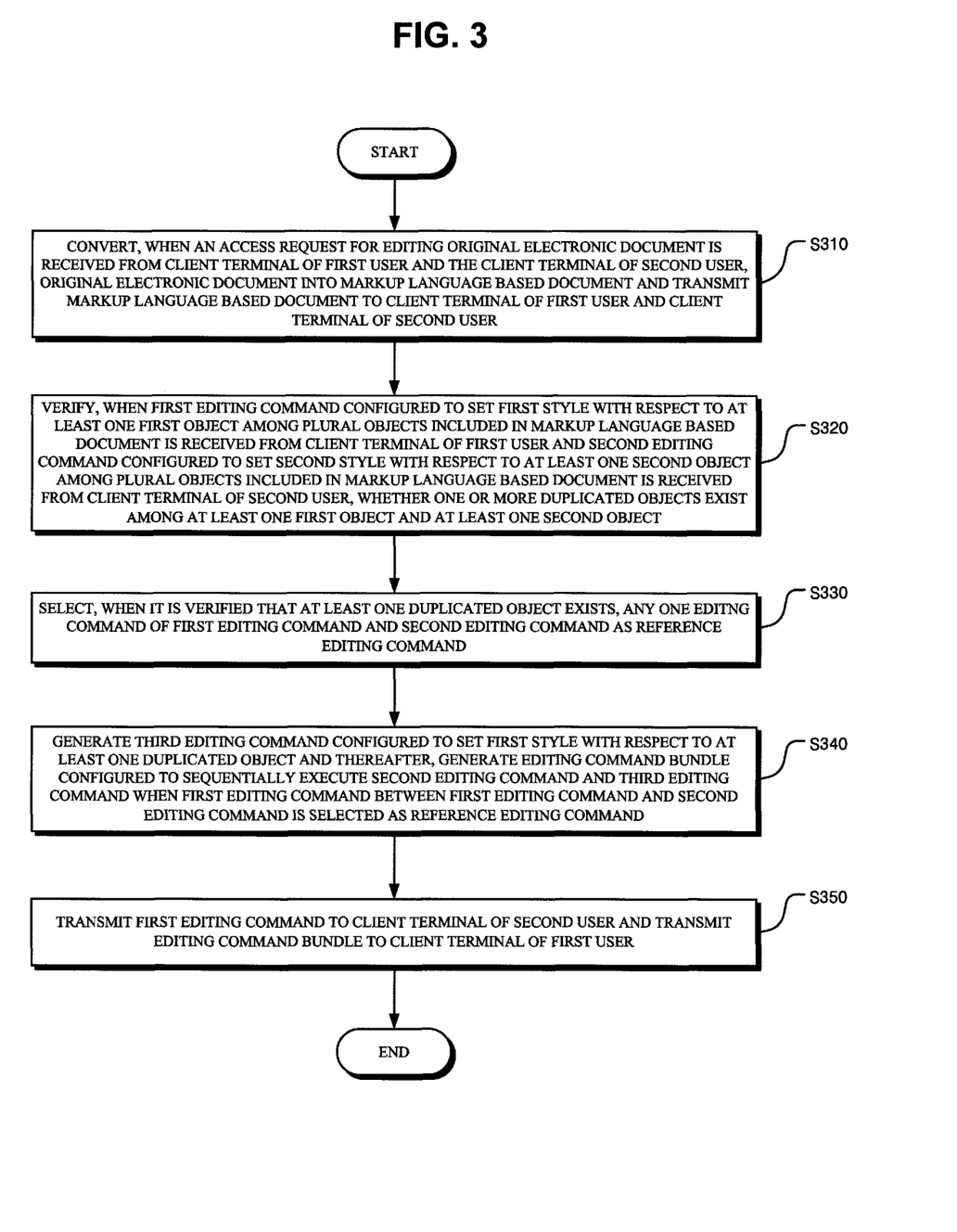
FIG. 3 is a flowchart illustrating an operating method of a document collaboration apparatus for supporting simultaneous editing of styles for objects according to an exemplary embodiment of the present invention.

FIG. 3 is a flowchart illustrating an operating method of a document collaboration apparatus for supporting simultaneous editing of styles for objects according to an exemplary embodiment of the present invention.

In step S310, when an access request for editing an original electronic document is received from a client terminal of a first user and the client terminal of a second user, the original electronic document is converted into a markup language based document and the markup language based document is transmitted to the client terminal of the first user and the client terminal of the second user.

In step S320, when a first editing command to set a first style with respect to at least one first object among a plurality of objects included in the markup language based document is received from the client terminal of the first user and a second editing command to set a second style with respect to at least one second object among the plurality of objects included in the markup language based document is received from the client terminal of the second user, it is verified whether there are one or more duplicated objects exist among the at least one first object and the at least one second object.

In step S330, when it is verified that at least one duplicated object exists, any one editing command of the first editing command and the second editing command is selected as a reference editing command.

In this case, according to the exemplary embodiment of the present invention, in step S330, an editing command first received by the document collaboration apparatus for supporting simultaneous editing of styles for objects between the first editing command and the second editing command may be selected as the reference editing command.

In step S340, a third editing command to set the first style is generated with respect to the at least one duplicated object and thereafter, an editing command bundle configured to sequentially execute the second editing command and the third editing command is generated when the first editing command between the first editing command and the second editing command is selected as the reference editing command.

In step S350, the first editing command is transmitted to the client terminal of the second user and the editing command bundle is transmitted to the client terminal of the first user.

In this case, according to the exemplary embodiment of the present invention, the first editing command may be constituted by an editing execution command for reflecting editing to the markup language based document, positional information of the at least one first object to which the editing execution command will be applied on the markup language based document, and first editing target information to define an attribute value for the first style, the second editing command may be constituted by the editing execution command, positional information of the at least one second object to which the editing execution command will be applied on the markup language based document, and second editing target information to define the attribute value for the second style, and the third editing command may be constituted by the editing execution command, positional information of the at least one duplicated object to which the editing execution command will be applied on the markup language based document, and third editing target information to define the attribute value for the first style.

According to the exemplary embodiment of the present invention, when the client terminal of the first user receives the markup language based document from the document collaboration apparatus for supporting simultaneous editing of styles for objects, the client terminal of the first user may display the markup language based document through a first browser and when the first editing command configured to set the first style is input with respect to the at least one first object among the plurality of objects included in the markup language based document by the first user, the first style may be set with respect to the at least one first object included in the markup language based document displayed through the first browser based on the first editing command and thereafter, the first editing command may be transmitted to the document collaboration apparatus for supporting simultaneous editing of styles for objects.

In this case, when the client terminal of the second user receives the markup language based document from the document collaboration apparatus for supporting simultaneous editing of styles for objects, the client terminal of the second user may display the markup language based document through a second browser and when the second editing command to set the second style is input with respect to the at least one second object among the plurality of objects included in the markup language based document by the second user, the second style may be set with respect to the at least one second object included in the markup language based document displayed through the second browser based on the second editing command and thereafter, the second editing command may be transmitted to the document collaboration apparatus for supporting simultaneous editing of styles for objects.

In this case, according to the exemplary embodiment of the present invention, when the client terminal of the first user receives the editing command bundle from the document collaboration apparatus for supporting simultaneous editing of styles for objects, the client terminal of the first user may set the style of the at least one second object as the second style based on the second editing command included in the editing command bundle and reset the style of the at least one duplicated object as the first style based on the third editing command included in the editing command bundle, with respect to the markup language based document in which the at least one first object is set as the first style according to the first editing command.

In this case, when the client terminal of the second user receives the first editing command from the document collaboration apparatus for supporting simultaneous editing of styles for objects, the client terminal of the second user may set the style of the at least one first object as the first style based on the first editing command with respect to the markup language based document in which the at least one second object is set as the second style according to the second editing command.

Hereinabove, the operating method of the document collaboration apparatus for supporting simultaneous editing of styles for objects according to the exemplary embodiment of the present invention has been described with reference to FIG. 3. Herein, since the operating method of the document collaboration apparatus for supporting simultaneous editing of styles for objects according to the exemplary embodiment of the present invention may correspond to a configuration for an operation of the document collaboration apparatus 110 for supporting simultaneous editing of styles for objects, which is described by using FIGS. 1 and 2, a more detailed description thereof will be omitted.

The operating method of the document collaboration apparatus for supporting simultaneous editing of styles for objects according to the exemplary embodiment of the present invention may be implemented by a computer program stored in a storage medium for executing the computer program through coupling with a computer.

The operating method of the document collaboration apparatus for supporting simultaneous editing of styles for objects according to the exemplary embodiment of the present invention may be implemented in a program command type which may be performed through various computer means and recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer-readable recording medium include magnetic media such as a hard disk, a floppy disk, and a magnetic tape, optical media such as a CD-ROM and a DVD, a magneto-optical media such as a floptical disk, and a hardware device which is specifically configured to store and examples of the program command such as a ROM, a RAM, and a flash memory. Examples of the program command include a high-level language code executable by a computer by using an interpreter, and the like, as well as a machine language code created by a compiler. The hardware device may be configured to be operated with one or more software modules in order to perform the operation of the present invention and vice versa.

The As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

The spirit of the present invention should not be defined only by the described exemplary embodiments, and it should be appreciated that claims to be described below and all which are equivalent to the claims or equivalently modified to the claims are included in the scope of the spirit of the present invention.

What is claimed is:

1. A document collaboration apparatus for supporting simultaneous editing of styles for objects, comprising:
   a document transmitting unit converting, when an access request for editing an original electronic document is received from a client terminal of a first user and the client terminal of a second user, the original electronic document into a markup language based document and transmitting the markup language based document to the client terminal of the first user and the client terminal of the second user;
   a duplicated object verifying unit verifying, when a first editing command configured to set a first style with respect to at least one first object among a plurality of objects included in the markup language based document is received from the client terminal of the first user and a second editing command configured to set a second style with respect to at least one second object among the plurality of objects included in the markup language based document is received from the client terminal of the second user, whether one or more duplicated objects exist among the at least one first object and the at least one second object;
   a reference editing command selecting unit selecting, when it is verified that at least one duplicated object exists, any one editing command of the first editing command and the second editing command as a reference editing command;
   an editing command bundle generating unit generating a third editing command configured to set the first style with respect to the at least one duplicated object and thereafter, generating an editing command bundle configured to sequentially execute the second editing command and the third editing command when the first editing command between the first editing command and the second editing command is selected as the reference editing command; and
   an editing command transmitting unit transmitting the first editing command to the client terminal of the second user and transmitting the editing command bundle to the client terminal of the first user,
   wherein when the client terminal of the first user receives the markup language based document from the document collaboration apparatus for supporting simultaneous editing of styles for objects, the client terminal of the first user displays the markup language based document through a first browser and when the first editing command configured to set the first style is input with respect to the at least one first object among the plurality of objects included in the markup language based document by the first user, the first style may be set with respect to the at least one first object included in the markup language based document displayed through the first browser based on the first editing command and thereafter, the first editing command is transmitted to the document collaboration apparatus for supporting simultaneous editing of styles for objects,
   when the client terminal of the second user receives the markup language based document from the document collaboration apparatus for supporting simultaneous editing of styles for objects, the client terminal of the second user displays the markup language based document through a second browser and when the second editing command configured to set the second style is input with respect to the at least one second object among the plurality of objects included in the markup language based document by the second user, the second style is set with respect to the at least one second object included in the markup language based document displayed through the second browser based on the second editing command and thereafter, the second editing command is transmitted to the document collaboration apparatus for supporting simultaneous editing of styles for objects,
   wherein when the client terminal of the first user receives the editing command bundle from the document collaboration apparatus for supporting simultaneous editing of styles for objects, the client terminal of the first user sets the style of the at least one second object including the at least one duplicated object as the second style based on the second editing command included in the editing command bundle and resets the style of the at least one duplicated object as the first style based on the third editing command included in the editing command bundle, with respect to the markup language based document in which the at least one first object is set as the first style according to the first editing command, and
   when the client terminal of the second user receives the first editing command from the document collaboration apparatus for supporting simultaneous editing of styles for objects, the client terminal of the second user sets the style of the at least one first object as the first style based on the first editing command with respect to the markup language based document in which the at least one second object is set as the second style according to the second editing command.

2. The document collaboration apparatus of claim 1, wherein the reference editing command selecting unit selects an editing command first received by the document collaboration apparatus for supporting simultaneous editing of styles for objects between the first editing command and the second editing command as the reference editing command.

3. The document collaboration apparatus of claim 1, wherein the first editing command is constituted by an editing execution command for reflecting editing to the markup language based document, positional information of the at least one first object to which the editing execution command will be applied on the markup language based document, and first editing target information to define an attribute value for the first style,
   the second editing command is constituted by the editing execution command, positional information of the at least one second object to which the editing execution command will be applied on the markup language based document, and second editing target information to define an attribute value for the second style, and
   the third editing command is constituted by the editing execution command, positional information of the at least one duplicated object to which the editing execution command will be applied on the markup language based document, and third editing target information to define the attribute value for the first style.

4. The document collaboration apparatus of claim 1, wherein the editing command bundle is configured to set the at least one duplicated object to have only the first style.

5. The document collaboration apparatus of claim 1, wherein in order to reset the style of the at least one duplicated object as the first style based on the third editing command in the editing command bundle, the client terminal of the first user is configured to:
  cancel the second style applied to the at least one duplicated object; and
  apply only the first style to the at least one duplicated object.

6. The document collaboration apparatus of claim 1, wherein the reference editing command selecting unit constantly selects a command from any designated one of the client terminals of the first and second users as the reference editing command.

7. An operating method of a document collaboration apparatus for supporting simultaneous editing of styles for objects, comprising:
  converting, when an access request for editing an original electronic document is received from a client terminal of a first user and the client terminal of a second user, the original electronic document into a markup language based document and transmitting the markup language based document to the client terminal of the first user and the client terminal of the second user;
  verifying, when a first editing command configured to set a first style with respect to at least one first object among a plurality of objects included in the markup language based document is received from the client terminal of the first user and a second editing command configured to set a second style with respect to at least one second object among the plurality of objects included in the markup language based document is received from the client terminal of the second user, whether one or more duplicated objects exist among the at least one first object and the at least one second object;
  selecting, when it is verified that at least one duplicated object exists, any one editing command of the first editing command and the second editing command as a reference editing command;
  generating a third editing command configured to set the first style with respect to the at least one duplicated object and thereafter, generating an editing command bundle configured to sequentially execute the second editing command and the third editing command when the first editing command between the first editing command and the second editing command is selected as the reference editing command; and
  transmitting the first editing command to the client terminal of the second user and transmitting the editing command bundle to the client terminal of the first user
  wherein when the client terminal of the first user receives the markup language based document from the document collaboration apparatus for supporting simultaneous editing of styles for objects, the client terminal of the first user displays the markup language based document through a first browser and when the first editing command configured to set the first style is input with respect to the at least one first object among the plurality of objects included in the markup language based document by the first user, the first style is set with respect to the at least one first object included in the markup language based document displayed through the first browser based on the first editing command and thereafter, the first editing command is transmitted to the document collaboration apparatus for supporting simultaneous editing of styles for objects,
  when the client terminal of the second user receives the markup language based document from the document collaboration apparatus for supporting simultaneous editing of styles for objects, the client terminal of the second user displays the markup language based document through a second browser and when the second editing command configured to set the second style is input with respect to the at least one second object among the plurality of objects included in the markup language based document by the second user, the second style is set with respect to the at least one second object included in the markup language based document displayed through the second browser based on the second editing command and thereafter, the second editing command is transmitted to the document collaboration apparatus for supporting simultaneous editing of styles for objects,
  wherein when the client terminal of the first user receives the editing command bundle from the document collaboration apparatus for supporting simultaneous editing of styles for objects, the client terminal of the first user sets the style of the at least one second object including the at least one duplicated object as the second style based on the second editing command included in the editing command bundle and resets the style of the at least one duplicated object as the first style based on the third editing command included in the editing command bundle, with respect to the markup language based document in which the at least one first object is set as the first style according to the first editing command, and
  when the client terminal of the second user receives the first editing command from the document collaboration apparatus for supporting simultaneous editing of styles for objects, the client terminal of the second user sets the style of the at least one first object as the first style based on the first editing command with respect to the markup language based document in which the at least one second object is set as the second style according to the second editing command.

8. The operating method of claim 7, wherein in the selecting of any one editing command as the reference editing command,
  an editing command first received by the document collaboration apparatus for supporting simultaneous editing of styles for objects between the first editing command and the second editing command is selected as the reference editing command.

9. The operating method of claim 7, wherein the first editing command is constituted by an editing execution command for reflecting editing to the markup language based document, positional information of the at least one first object to which the editing execution command will be applied on the markup language based document, and first editing target information to define an attribute value for the first style,
  the second editing command is constituted by the editing execution command, positional information of the at least one second object to which the editing execution command will be applied on the markup language based document, and second editing target information to define an attribute value for the second style, and
  the third editing command is constituted by the editing execution command, positional information of the at least one duplicated object to which the editing execution command will be applied on the markup language based document, and third editing target information to define the attribute value for the first style.

10. The operating method of claim 7, wherein the editing command bundle is configured to set the at least one duplicated object to have only the first style.

11. The operating method of claim 7, wherein in order to reset the style of the at least one duplicated object as the first style based on the third editing command in the editing command bundle, the client terminal of the first user is configured to:
cancel the second style applied to the at least one duplicated object; and
apply only the first style to the at least one duplicated object.

12. The operating method of claim 7, wherein the selecting any one editing command as the reference editing command includes constantly selecting a command from any designated one of the client terminals of the first and second users as the reference editing command.

13. A non-transitory computer readable recording medium in which a program for executing an operating method of a document collaboration apparatus for supporting simultaneous editing of styles for objects is recorded, the method comprising:
converting, when an access request for editing an original electronic document is received from a client terminal of a first user and the client terminal of a second user, the original electronic document into a markup language based document and transmitting the markup language based document to the client terminal of the first user and the client terminal of the second user;
verifying, when a first editing command configured to set a first style with respect to at least one first object among a plurality of objects included in the markup language based document is received from the client terminal of the first user and a second editing command configured to set a second style with respect to at least one second object among the plurality of objects included in the markup language based document is received from the client terminal of the second user, whether one or more duplicated objects exist among the at least one first object and the at least one second object;
selecting, when it is verified that at least one duplicated object exists, any one editing command of the first editing command and the second editing command as a reference editing command;
generating a third editing command configured to set the first style with respect to the at least one duplicated object and thereafter, generating an editing command bundle configured to sequentially execute the second editing command and the third editing command when the first editing command between the first editing command and the second editing command is selected as the reference editing command; and
transmitting the first editing command to the client terminal of the second user and transmitting the editing command bundle to the client terminal of the first user wherein when the client terminal of the first user receives the markup language based document from the document collaboration apparatus for supporting simultaneous editing of styles for objects, the client terminal of the first user displays the markup language based document through a first browser and when the first editing command configured to set the first style is input with respect to the at least one first object among the plurality of objects included in the markup language based document by the first user, the first style is set with respect to the at least one first object included in the markup language based document displayed through the first browser based on the first editing command and thereafter, the first editing command is transmitted to the document collaboration apparatus for supporting simultaneous editing of styles for objects, when the client terminal of the second user receives the markup language based document from the document collaboration apparatus for supporting simultaneous editing of styles for objects, the client terminal of the second user displays the markup language based document through a second browser and when the second editing command configured to set the second style is input with respect to the at least one second object among the plurality of objects included in the markup language based document by the second user, the second style is set with respect to the at least one second object included in the markup language based document displayed through the second browser based on the second editing command and thereafter, the second editing command is transmitted to the document collaboration apparatus for supporting simultaneous editing of styles for objects, wherein when the client terminal of the first user receives the editing command bundle from the document collaboration apparatus for supporting simultaneous editing of styles for objects, the client terminal of the first user sets the style of the at least one second object including the at least one duplicated object as the second style based on the second editing command included in the editing command bundle and resets the style of the at least one duplicated object as the first style based on the third editing command included in the editing command bundle, with respect to the markup language based document in which the at least one first object is set as the first style according to the first editing command, and when the client terminal of the second user receives the first editing command from the document collaboration apparatus for supporting simultaneous editing of styles for objects, the client terminal of the second user sets the style of the at least one first object as the first style based on the first editing command with respect to the markup language based document in which the at least one second object is set as the second style according to the second editing command.

\* \* \* \* \*